(12) United States Patent
He (10) Patent No.: US 11,959,573 B2
(45) Date of Patent: Apr. 16, 2024

(54) STEEL RING (71) Applicant: Zhejiang Howhi Pipe Industry Co., Ltd., Zhejiang (CN)

(72) Inventor: Yuguang He, Zhejiang (CN)

(73) Assignee: Zhejiang Howhi Pipe Industry Co., Ltd., Shaoxing (CN)

( * ) Notice: Subject to any disclaimer, the term of this patent is extended or adjusted under 35 U.S.C. 154(b) by 58 days.

(21) Appl. No.: 17/850,627

(22) Filed: Jun. 27, 2022

(65) Prior Publication Data
US 2022/0325835 A1 Oct. 13, 2022

Related U.S. Application Data (63) Continuation-in-part of application No. PCT/CN2020/105064, filed on Jul. 28, 2020.

(30) Foreign Application Priority Data

Jul. 22, 2020 (CN) .......................... 202010709387.3

(51) Int. Cl.
F16L 37/091 (2006.01)

(52) U.S. Cl.
CPC .................................. *F16L 37/091* (2013.01)

(58) Field of Classification Search
CPC ..... F16L 37/091; F16L 13/141; F16L 13/142; F16L 21/08
See application file for complete search history.

(56) References Cited

U.S. PATENT DOCUMENTS 4,842,306 A * 6/1989 Zeidler ................... F16L 21/08
                                                                      285/104
6,499,771 B1 * 12/2002 Snyder, Sr. ......... F16L 37/0915
                                                                      285/319

(Continued)

FOREIGN PATENT DOCUMENTS

| CN | 102308136 A | 1/2012 |
| CN | 104813089 A | 7/2015 |

(Continued)

OTHER PUBLICATIONS

International Search Report for PCT/CN2020/105064 dated Apr. 27, 2021, 2 pgs.

*Primary Examiner* — David Bochna
(74) *Attorney, Agent, or Firm* — Blank Rome LLP (57) ABSTRACT

A steel ring includes a locking component. The locking component is provided on an inner surface of a ring body in a protruding manner. The locking component includes locking teeth, and the locking tooth is sheet-like and includes a fixed part and a contact part. Multiple locking teeth constitute a first locking tooth group, and with regard to the locking teeth in the first locking tooth group, the distance between the fixed parts is smaller than the distance between the contact parts. Multiple locking teeth constitute a second locking tooth group, and with regard to the locking teeth in the second locking tooth group, the distance between the fixed parts is greater than the distance between the contact parts. The ring body has a first state and a second state. When the ring body is in the first state, the ring body is in an unclosed annular shape, and when the ring body is in the second state, the ring body is in a closed annular shape.

16 Claims, 5 Drawing Sheets

(56) References Cited

U.S. PATENT DOCUMENTS

| | | | |
|---|---|---|---|
| 6,805,385 B2* | 10/2004 | Viegener | F16L 13/142 |
| | | | 285/382.2 |
| 9,234,611 B2* | 1/2016 | Arning | F16L 13/142 |
| 9,791,078 B2* | 10/2017 | Lee | F16L 13/142 |
| 11,451,027 B2* | 9/2022 | Morse | H01R 4/26 |
| 11,652,339 B2* | 5/2023 | Platt | F16L 13/142 |
| | | | 285/149.1 |
| 2019/0024827 A1* | 1/2019 | Ruissen | F16L 13/142 |
| 2019/0293211 A1* | 9/2019 | Lee | F16L 17/02 |
| 2020/0109805 A1* | 4/2020 | He | F16L 13/142 |

FOREIGN PATENT DOCUMENTS

| | | |
|---|---|---|
| CN | 105579758 A | 5/2016 |
| DE | 10335530 A1 | 10/2004 |
| GB | 2182743 A | 5/1987 |

\* cited by examiner

STEEL RING

RELATED APPLICATIONS

The present application is a continuation-in-part of International Application No. PCT/CN2020/105064, filed on Jul. 28, 2020, which claims benefit to Chinese Patent Application No. CN2020/10709387.3, filed on Jul. 22, 2020. The entire contents of these applications are incorporated herein by reference.

FIELD OF THE INVENTION

The present invention relates to the field of pipe fitting connection, and in particular to a steel ring used for connecting compression pipe fittings.

DESCRIPTION OF THE PRIOR ART

In the fields of firefighting, gas supply, heating, etc., the connection of pipes is a regular requirement. Compared with traditional connection modes such as welding and skein twisting, a compression connection mode has become a common connection mode in this field due to its multiple advantages.

In the compression connection mode, a relatively thick tube (referred to as a pipe fitting in this application) is sleeved on a relatively thin tube (referred to as a pipe in this application), and a fixing piece and a seal are provided. Then the pipe is compressed and deformed by an external force, so that the pipe fitting and the pipe are fixedly connected and sealed without water leakage.

Compared with traditional connection technologies, the compression mode for connecting pipelines has many advantages. First of all, the difficulty of construction is greatly reduced. Welding connection requires professional welding workers, and the requirements for site equipment are high, and the construction efficiency is also very low. However, compression is cold pressing by special equipment, and workers who operate cold pressing equipment can go to work after extreme training. Compared with welding, the difficulty of construction is reduced and the efficiency is improved. Secondly, most of the usual construction sites cannot achieve protection of an inner wall of a welding workshop with argon gas. At a high temperature close to 1000 degrees Celsius during welding, it is easy to cause chromium deficiency in materials at welding point positions. When a pipeline is used for a long time, the corrosion effect of chlorine elements in water to the materials at the welding positions will lead to water leakage of the pipeline. In addition, for the welding process, it is not easy to form a better welding quality due to the difficulty of operation at a turning position of the pipeline. However, the compression connection can avoid adverse effects caused by welding technologies, process conditions, site equipment, etc., ensure connection quality, and improve work efficiency.

In the compression connection mode, the steel ring is one of the most critical components. The function of the steel ring is to lock the pipe after the pipe fitting is compressed to prevent the pipe from falling out of the pipe fitting. This kind of steel ring is usually annular, and at the same time, a locking component is provided on the steel ring. After the pipe fitting is compressed, the diameter of the steel ring decreases with the inner diameter of the pipe fitting, so that the pipe fitting is tightly held, and the locking component provided on the inner surface of the steel ring can prevent the pipe from falling out of the pipe fitting.

Fixing components commonly used in the prior art cannot generate a large enough locking force, which makes the fixing effect unsatisfactory. Also, the asymmetric structures of some steel rings lead to unilateral stress on a stamping die during manufacturing and processing, which easily damages the die, resulting in processing difficulties and rising costs.

Therefore, those skilled in the art devote themselves to developing a steel ring that can generate greater locking force while protecting the die and making the die have a longer service life.

SUMMARY OF THE INVENTION

In view of the above-mentioned shortcomings of the prior art, technical problems to be solved by the present invention are how to design a locking mechanism to make a steel ring generate a greater locking force, and how to protect the die used for processing.

To achieve the above purpose, those skilled in the art provide a steel ring, comprising a ring body and a locking mechanism, wherein the ring body has an inner surface and an outer surface, the locking mechanism comprises a locking component, and the locking component is provided on the inner surface of the ring body.

Further, the locking component is provided to protrude from the inner surface.

Further, the locking component comprises locking teeth, each of the locking teeth comprises a fixed part and a contact part, the fixed part is fixedly provided to the inner surface, and the contact part is provided to protrude from the inner surface and be inclined in a direction of a second axis.

Further, the contact part is sheet-like, an inclination angle of the contact part is less than 90 degrees, and the inclination angle is an included angle between a plane where the contact part is located and the inner surface.

Further, the locking component comprises a first locking tooth group, the first locking tooth group comprises two or more locking teeth with different inclination directions, and in the first locking tooth group, a distance between the fixed part of every each of the locking teeth and the fixed part of other of the locking teeth is smaller than the distance between corresponding contact parts.

Further, the inclination angle of each of the locking teeth in the first locking tooth group is same.

Further, the number of the locking teeth in the second locking tooth group is an even number, and the locking teeth are arranged axisymmetrically with respect to a first axis.

Further, in the first locking tooth group, there is at least one of the locking teeth, the fixed part of which is close to a locking direction and the contact part of which is close to a detachment direction.

Further, the steel ring comprises two or more first locking tooth groups.

Further, the two or more of the first locking tooth groups are arranged centrosymmetrically with respect to the second axis.

Further, the locking component comprises a second locking tooth group, the second locking tooth group comprises two or more locking teeth with different inclination directions, and in the second locking tooth group, a distance between the fixed part of each of the locking teeth and the fixed part of other of the locking teeth is greater than a distance between corresponding contact parts.

Further, the inclination angle of each of the locking teeth in the second locking tooth group is the same.

Further, the number of the locking teeth in the second locking tooth group is an even number, and the locking teeth are arranged axisymmetrically with respect to the first axis.

Further, in the first locking tooth group and the second locking tooth group, there is at least one of the locking teeth, the fixed part of which is close to the locking direction and the contact part of which is close to the detachment direction.

Further, the steel ring comprises two or more of the second locking tooth groups. Further, the two or more of the second locking tooth groups are arranged centrosymmetrically with respect to the second axis.

Further, the axial distance of the locking tooth in the first locking tooth group is greater than the axial distance of the locking tooth in the second locking tooth group, and the axial distance is the distance from the contact part of the locking tooth to the first axis.

Further, the steel ring is made by one-step stamping.

Further, the steel ring comprises a first state and a second state, and in the first state, the steel ring is in an unclosed annular shape.

Further, in the second state, the steel ring is in a closed annular shape.

Further, the first axis is set to be arranged circumferentially on the ring body, and divides the ring body into two parts of equal size.

Further, the second axis is set to be perpendicular to a plane where the ring body is located, and passes through the center of a circle where the ring body is located.

Further, the first state is a state when the ring body is not compressed. Further, the second state is a state after the ring body is compressed.

Compared with the prior art, this application has at least the following technical effects:

1. In the present invention, a part of the locking teeth are arranged toward the detachment direction, so that a greater locking force can be generated when the pipe fitting has a tendency to detach.

2. The locking teeth in the present invention are arranged symmetrically. Therefore, in the process of stamping and forming, the force on both sides of the die is uniform, so that the service life of the die is prolonged, the processing consistency is increased, and the production cost is reduced.

The concept, specific structures, and technical effects of the present invention will be further illustrated below in conjunction with accompanying drawings, such that the purpose, features, and effects of the present invention can be fully understood.

DETAILED DESCRIPTION OF THE PREFERRED EMBODIMENTS

A plurality of preferred embodiments of the present invention will be described hereafter with reference to the accompanying drawings of the description, so that the technical contents thereof will be more clearly and easily understood. The present invention may be embodied in many different forms of embodiments, and the protection scope of the present invention is not limited to the embodiments mentioned herein.

In the drawings, the components having same structures are denoted by same reference numerals, and the components having similar structures or functions are denoted by similar reference numerals. The dimension and thickness of each of the components shown in the drawings are shown arbitrarily, and the present invention does not limit the dimension and thickness of each of the components. In order to make the illustration clearer, the thickness of the components is appropriately exaggerated in some places in the drawings.

Figure 1:
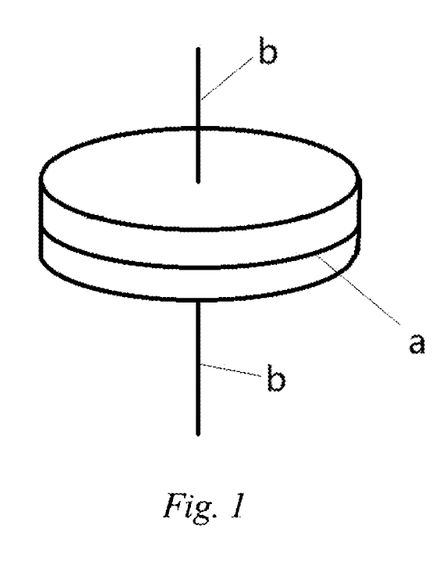
FIG. 1 is a schematic illustration of a first axis and a second axis in the present invention.
Figure 2:
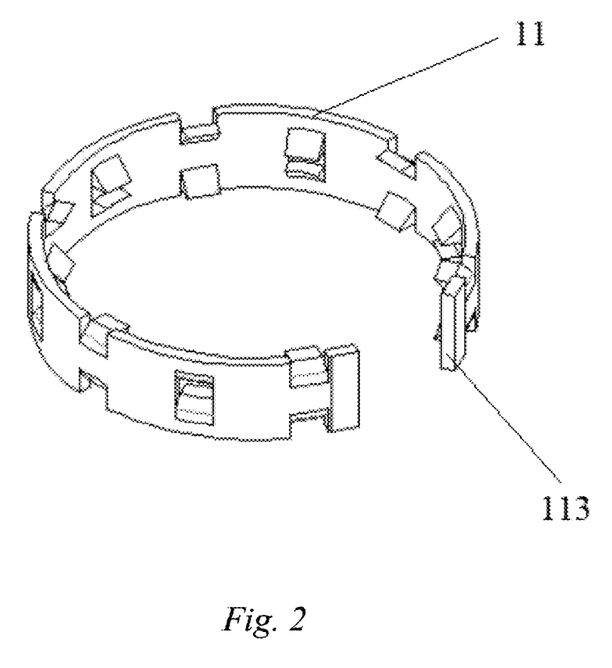
FIG. 2 is a schematic view of an overall structure of one embodiment in the present invention.
Figure 3:
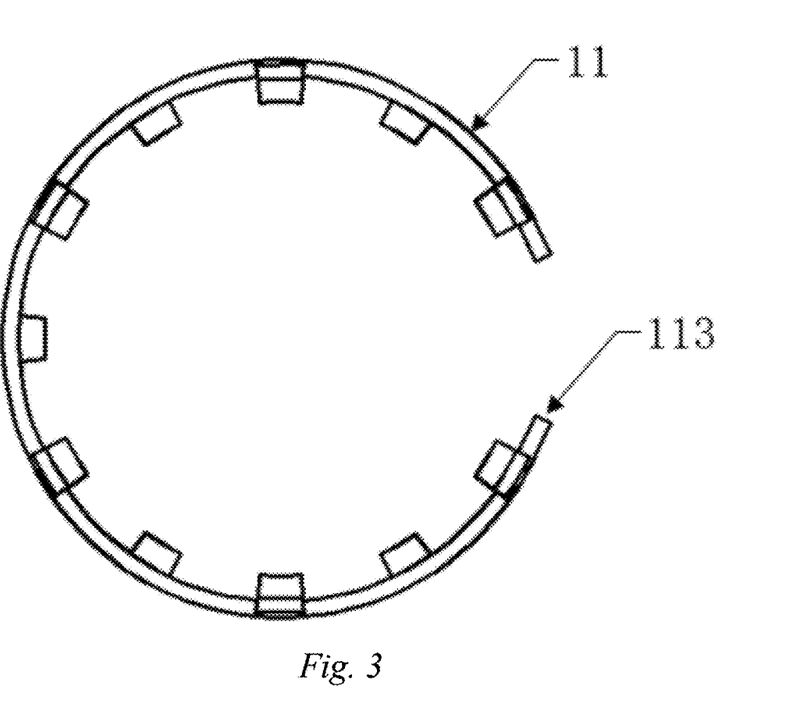
FIG. 3 is a top view of one embodiment in the present invention.
Figure 5:
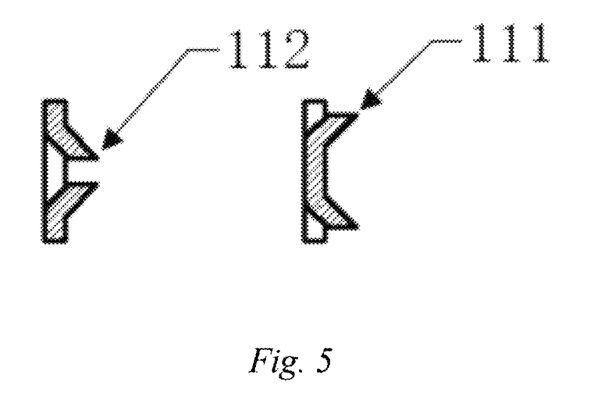
FIG. 5 is a schematic structural view of a locking component of one embodiment in the present invention.
Figure 6:
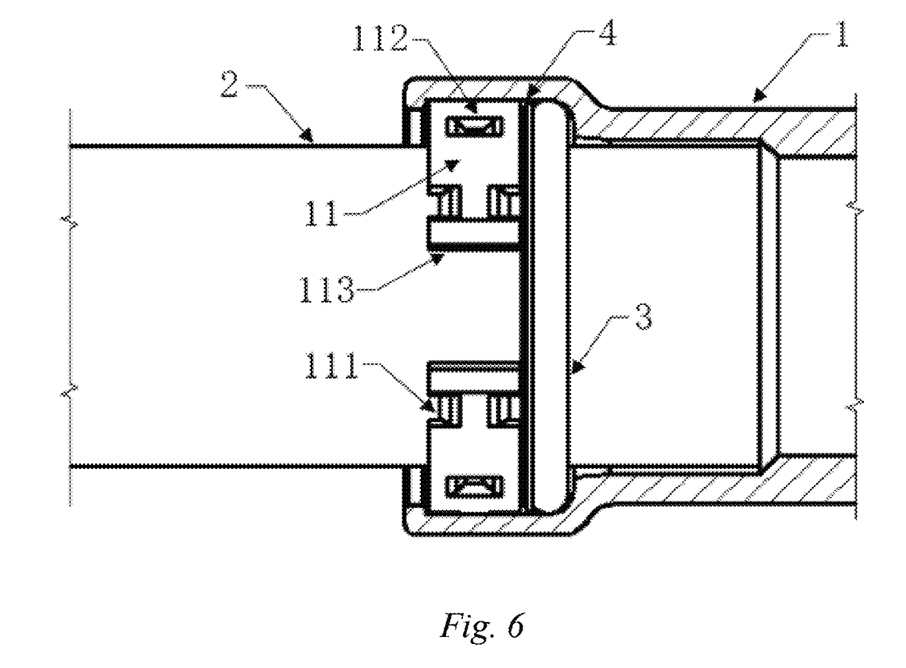
FIG. 6 is a schematic view of one embodiment in a first state after installation in the present invention.

As shown in FIG. 1, a ring body of a steel ring mentioned in this application is an annular object. It has a certain width, and if the ring body of the present invention is unfolded, it will be a rectangular sheet-like object. In this application, the mentioned first axis a specifically refers to a central line on the ring body. If the ring body of the present invention is unfolded, the first axis a is a straight line arranged along the length of the rectangle, and the first axis a divides the rectangle into two parts with the same shape and area. The second axis b is a straight line perpendicular to the plane where the ring body is located. The ring body is an annular object, and the second axis b passes through the center of the circle where the ring body is located. As shown in FIG. 6, the pipe fitting 1 is sleeved on the outer surface of the pipe 2, wherein the direction from the pipe 2 to the pipe fitting 1 is called the locking direction; and the direction from the pipe fitting 1 to the pipe 2 is called the detachment direction. FIGS. 2 to 3 show an embodiment of the present invention, which comprises a ring body 11. When this embodiment is not installed inside the pipe fitting, the ring body 11 is in an unclosed annular shape, that is, the first state. Therefore, the ring body 11 has a notch 113. After this embodiment is installed inside the pipe fitting and compressed, the ring body 11 is also compressed, the diameter of the ring is reduced, two ends of the ring body 11 are pressed together, and the notch 113 disappears. At this time, this embodiment is in a closed annular shape, that is, the second state. Locking teeth are provided on an inner surface of the ring body 11 in a protruding manner, as a locking component of this embodiment. FIG. 5 is a schematic particular structural view of locking teeth in this embodiment. The locking tooth comprises a fixed part fixedly connected to the inner surface of the ring body 11 and a contact part protruding from the inner surface of the ring body 11. The contact part is in contact with the pipe sleeved inside the pipe fitting during use, and can be embedded into the outer surface of the pipe when the pipe tends to be detached, thus playing a role of locking the pipe. Specifically, the entire locking tooth is sheet-like, and the plane where the locking tooth is located forms a certain included angle with the inner surface of the ring body 11, and the included angle is less than 90 degrees. For the plurality of locking teeth in this embodiment, that included angles are the same. In other embodiments, different included angles may also be set according to specific needs. As shown in FIG. 5, in this embodiment, a pair of locking teeth with two fixed parts arranged close to each other and two contact parts arranged separately (that is, arranged in a back-to-back direction) constitute a first locking tooth group 111. Locking teeth with two fixed parts arranged separately and two contact parts arranged close to each other (that is, arranged in a face-to-face direction) constitute a second locking tooth group 112. The two locking teeth included in the first locking tooth group 111 and the two locking teeth included in the second locking tooth group 112 are both arranged axisymmetrically with respect to the first axis a. Although in this embodiment, the fixed parts of the two locking teeth included in the first locking tooth group 111 are arranged adjacent to each other, in other embodiments, the fixed parts of the two locking teeth can be arranged separately. As long as the distance between the fixed parts is smaller than the distance between the contact parts (that is, they are arranged in a back-to-back direction), and the fixed parts/the contact parts are axisymmetric with respect to the first axis a, a similar technical effect can also be achieved.

No matter in the first locking tooth group 111 or the second locking tooth group 112, there is at least one locking tooth, which is provided toward the locking direction, that is, its fixed part points to the detachment direction, and its contact part points to the locking direction. Both the first locking tooth group 111 and the second locking tooth group 112 in this embodiment include two locking teeth. In other embodiments, it is also possible to provide more than two locking teeth in a locking tooth group according to actual needs, as long as at least one locking tooth is provided toward the locking direction.

Figure 4:
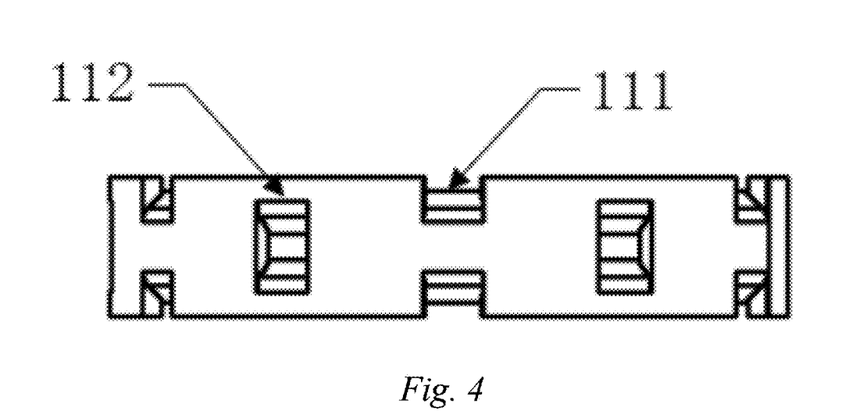
FIG. 4 is a schematic view of position distribution of locking components of one embodiment in the present invention.

As shown in FIG. 4, it is a schematic view of position setting of the first locking tooth group 111 and the second locking tooth group 112 in an embodiment of the present invention, and its three-dimensional schematic view is shown in FIG. 2. The first locking tooth group 111 and the second locking tooth group 112 are respectively arranged centrosymmetrically with respect to the second axis b. In this embodiment, it is preferable to use six groups of first locking tooth groups 111 and five groups of second locking tooth groups 112. On the premise that they are arranged centrosymmetrically with respect to the second axis b, the first locking tooth groups 111 and the second locking tooth groups 112 are spaced apart. However, the number of the first locking tooth groups 111 and the number of the second locking tooth groups 112 are not fixed, and the numbers can be adjusted according to the actual size and requirements of the ring body. In other numbers, it is possible that the first locking tooth groups 111 and the second locking tooth groups 112 are not spaced apart.

Figure 7:
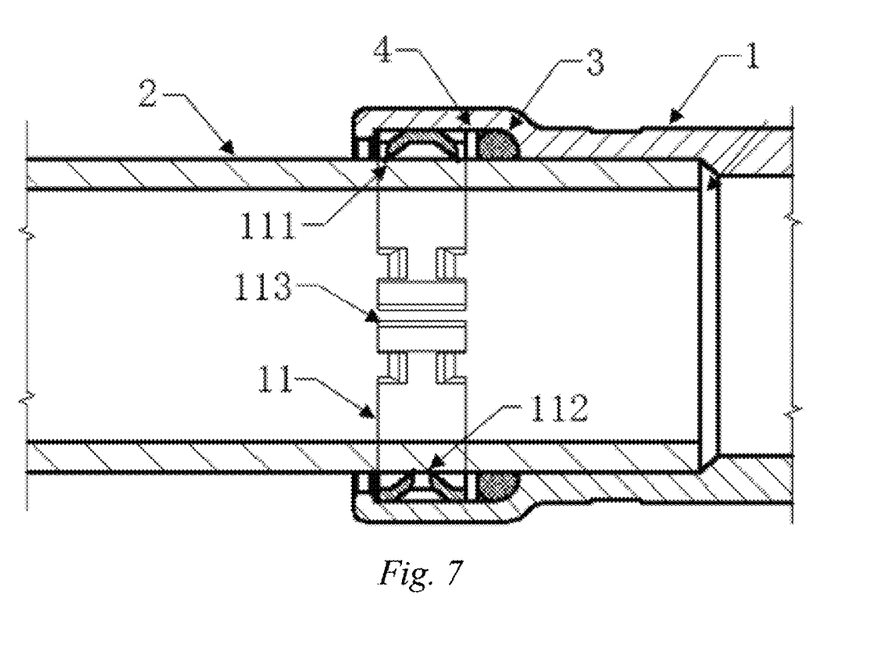
FIG. 7 is a schematic view of one embodiment in a second state after installation in the present invention.

As shown in FIG. 6 and FIG. 7, it is a schematic view of an embodiment of the present invention used for pipeline compression connection. The pipe fitting 1 is sleeved on the outer surface of the pipe 2, and a sealing ring 3 and a gasket 4 are respectively provided between the pipe 2 and the pipe fitting 1. When the pipe 2 presses the sealing ring 3 and the pipe fitting 1 tightly through the gasket 4, the sealing performance of the pipeline interface is good, and there is no leakage of water or air. However, the pipe fitting 1 may be detached from the pipe 2 due to various reasons, so the ring body 11 of this embodiment is used. Before the pipe fitting 1 is not compressed, the ring body 11 is sleeved on the pipe 2, and the gasket 4 and the sealing ring 3 are pressed tightly. At this time, the ring body 11 is in the first state, in an unclosed annular shape, and has a notch 113. After the pipe fitting 1 is compressed, the diameter of the pipe fitting 1 becomes smaller, the ring body 11 is in a closed annular shape under the restriction of the pipe fitting 1, and the notch 113 disappears. At this time, the ring body 11 is in the second state, and the locking teeth are embedded in the outer surface of the pipe 2.

When the pipe 2 has a tendency to detach from the pipe fitting 1, that is, the pipe 2 has a tendency to move in the detachment direction, the pipe 2 generates a friction force pointing to the detachment direction on the locking teeth. The contact part of the locking tooth provided toward the locking direction will be deformed after receiving the friction force pointing to the detachment direction, and its contact part will rotate around its fixed part, that is, the sheet-like locking tooth will be lifted upwards. This movement causes the height of the contact part of the locking tooth from the inner surface of the ring to further increase, thereby increasing the depth of the contact part embedded in the pipe 2, increasing the locking force of the ring on the pipe 2, and further locking the pipe 2 to prevent it from falling out of the pipe fitting 1.

The preferred specific embodiments of the present invention have been described in detail above. It is to be understood that numerous modifications and variations can be made by those ordinary in the art in accordance with the concepts of the present invention without any inventive effort. Therefore, all technical solutions that can be obtained by a person skilled in the art based on the prior art through logical analysis, deduction, or limited experiments according to the concept of the present invention should fall within the protection scope defined by the claims.

The invention claimed is:

1. A steel ring, comprising a ring body and a locking mechanism, wherein the ring body has an inner surface and an outer surface, the locking mechanism comprises a locking component, and the locking component is provided on the inner surface of the ring body; and the ring body has a first state and a second state, wherein when the ring body is in the first state, the ring body is in an unclosed annular shape, and when the ring body is in the second state, the ring body is in a closed annular shape;

wherein the locking component is provided to protrude from the inner surface, the locking component comprises locking teeth, each of the locking teeth comprises a fixed part and a contact part, the fixed part is fixedly provided to the inner surface, and the contact part is provided to protrude from the inner surface and be inclined in a direction of a second axis;

wherein the locking component comprises a first locking tooth group, the first locking tooth group comprises two or more locking teeth with different inclination directions, and in the first locking tooth group, a distance between the fixed part of each of the locking teeth and the fixed part of other of the locking teeth is smaller than the distance between corresponding contact parts;

wherein the locking component comprises a second locking tooth group, the second locking tooth group comprises two or more locking teeth with different inclination directions, and in the second locking tooth group, a distance between the fixed part of each of the locking teeth and the fixed part of other of the locking teeth is greater than a distance between corresponding contact parts.

2. The steel ring of claim 1, wherein the contact part is sheet-like, an inclination angle of the contact part is less than 90 degrees, and the inclination angle is an included angle between a plane where the contact part is located and the inner surface.

3. The steel ring of claim 1, wherein the inclination angle of each of the locking teeth in the first locking tooth group is same.

4. The steel ring of claim 3, wherein the number of the locking teeth in the first locking tooth group is an even number, and the locking teeth are arranged axisymmetrically with respect to a first axis.

5. The steel ring of claim 4, wherein in the first locking tooth group, there is at least one of the locking teeth, the fixed part of which is close to a locking direction and the contact part of which is close to a detachment direction.

6. The steel ring of claim 5, comprising two or more first locking tooth groups.

7. The steel ring of claim 6, wherein the two or more first locking tooth groups are arranged centrosymmetrically with respect to the second axis.

8. The steel ring of claim 1, wherein the inclination angle of each of the locking teeth in the second locking tooth group is same.

9. The steel ring of claim 8, wherein the number of the locking teeth in the second locking tooth group is an even number, and the locking teeth are arranged axisymmetrically with respect to the first axis.

10. The steel ring of claim 9, wherein, in the first locking tooth group and the second locking tooth group, there is at least one of the locking teeth, the fixed part of which is close to the locking direction and the contact part of which is close to the detachment direction.

11. The steel ring of claim 10, comprising two or more second locking tooth groups.

12. The steel ring of claim 11, wherein the two or more second locking tooth groups are arranged centrosymmetrically with respect to the second axis.

13. The steel ring of claim 12, wherein an axial distance of the locking teeth in the first locking tooth group is greater than an axial distance of the locking teeth in the second locking tooth group, and the axial distance is a distance from the contact part of each of the locking teeth to the first axis.

14. The steel ring of claim 1, wherein the steel ring is made by one-step stamping.

15. A piping system, comprising a pipe fitting, a pipe, and the steel ring of claim 1, wherein one end of the pipe fitting is sleeved on an outer surface of the pipe, the steel ring is sleeved on the pipe and is located between the pipe fitting and the pipe, and the steel ring is configured to apply a locking force on the pipe.

16. The piping system of claim 15, wherein the steel ring is configured that when the pipe is detached from the pipe fitting, locking teeth of the steel ring are deformed so that depth of contact parts of the locking teeth embedded in the pipe increases.

* * * * *